United States Patent [19]

Blackburn

[11] Patent Number: 5,054,109

[45] Date of Patent: Oct. 1, 1991

[54] TRUNKED RADIO SYSTEM HAVING FLEET QUEUE ALERT

[75] Inventor: William J. Blackburn, Lynchburg, Va.

[73] Assignee: Ericsson GE Mobile Communications Inc., Lynchburg, Va.

[21] Appl. No.: 668,398

[22] Filed: Mar. 14, 1991

Related U.S. Application Data

[63] Continuation of Ser. No. 286,691, Dec. 20, 1988, abandoned.

[51] Int. Cl.$^5$ .......................... H04B 7/14; H04Q 7/00
[52] U.S. Cl. ........................................ 455/17; 455/34; 455/54
[58] Field of Search .................. 455/33, 34, 10, 54, 455/56, 86, 38, 39, 17; 379/60, 63

[56] References Cited

U.S. PATENT DOCUMENTS

| | | | |
|---|---|---|---|
| 3,588,371 | 6/1971 | Dal Monte et al. | 455/55 |
| 4,012,597 | 3/1977 | Lynk, Jr. et al. | 455/53 |
| 4,553,263 | 11/1985 | Smith et al. | 455/34 |
| 4,554,677 | 11/1985 | Smith et al. | 455/34 |
| 4,573,207 | 2/1986 | Smith et al. | 455/54 |
| 4,658,435 | 4/1987 | Childress et al. | 455/17 |
| 4,680,786 | 7/1987 | Baker et al. | 379/60 |
| 4,682,367 | 7/1987 | Childress et al. | 455/17 |

Primary Examiner—Reinhard J. Eisenzopf
Assistant Examiner—Lisa Charouel
Attorney, Agent, or Firm—Nixon & Vanderhye

[57] ABSTRACT

A trunked radio communications system is disclosed which includes a repeater base station and plural fleets of mobile and/or portable radio transceivers. When all communication channels are busy, not only is the initiating unit informed that it has been placed in a queue of channel assignment requests, but also the called units in the respective called fleet are given an indication that in effect they have been placed in the queue. This indication may, for example be an audible indication and/or a visual indication from a display lamp, light emitting diode or liquid crystal display. In this fashion, each mobile or portable radio in a fleet is provided with advance notice that it is about to receive a call momentarily. Such a mobile or portable radio is thereby informed that as soon as the system can provide a channel assignment for the calling unit, that a call will be received. Accordingly, a member of the fleet receiving such advance notice, rather than leaving his or her vehicle or turning off his or her radio to, for example, take an extended break, will be informed to standby the radio since a call is imminent.

30 Claims, 5 Drawing Sheets

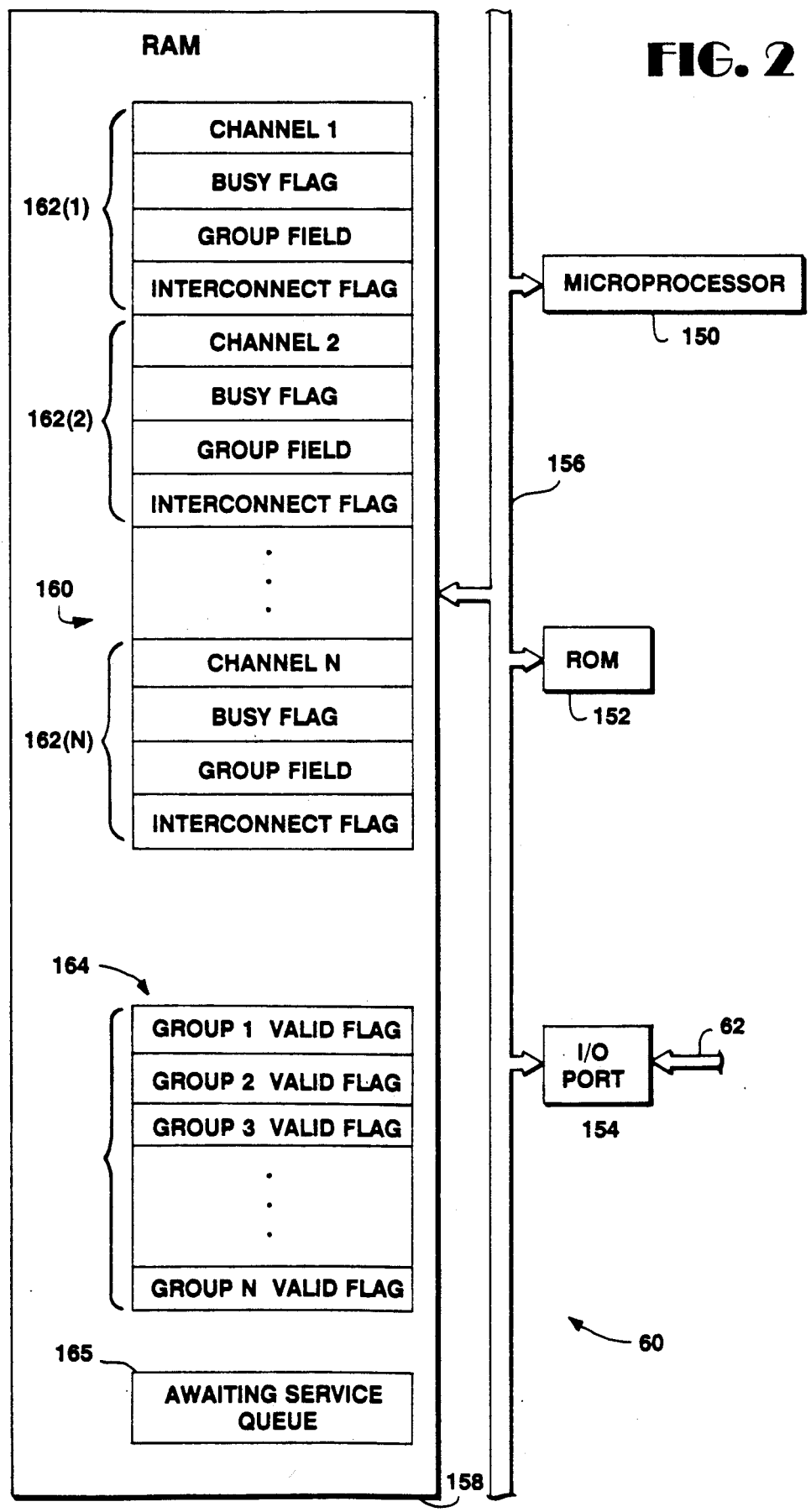

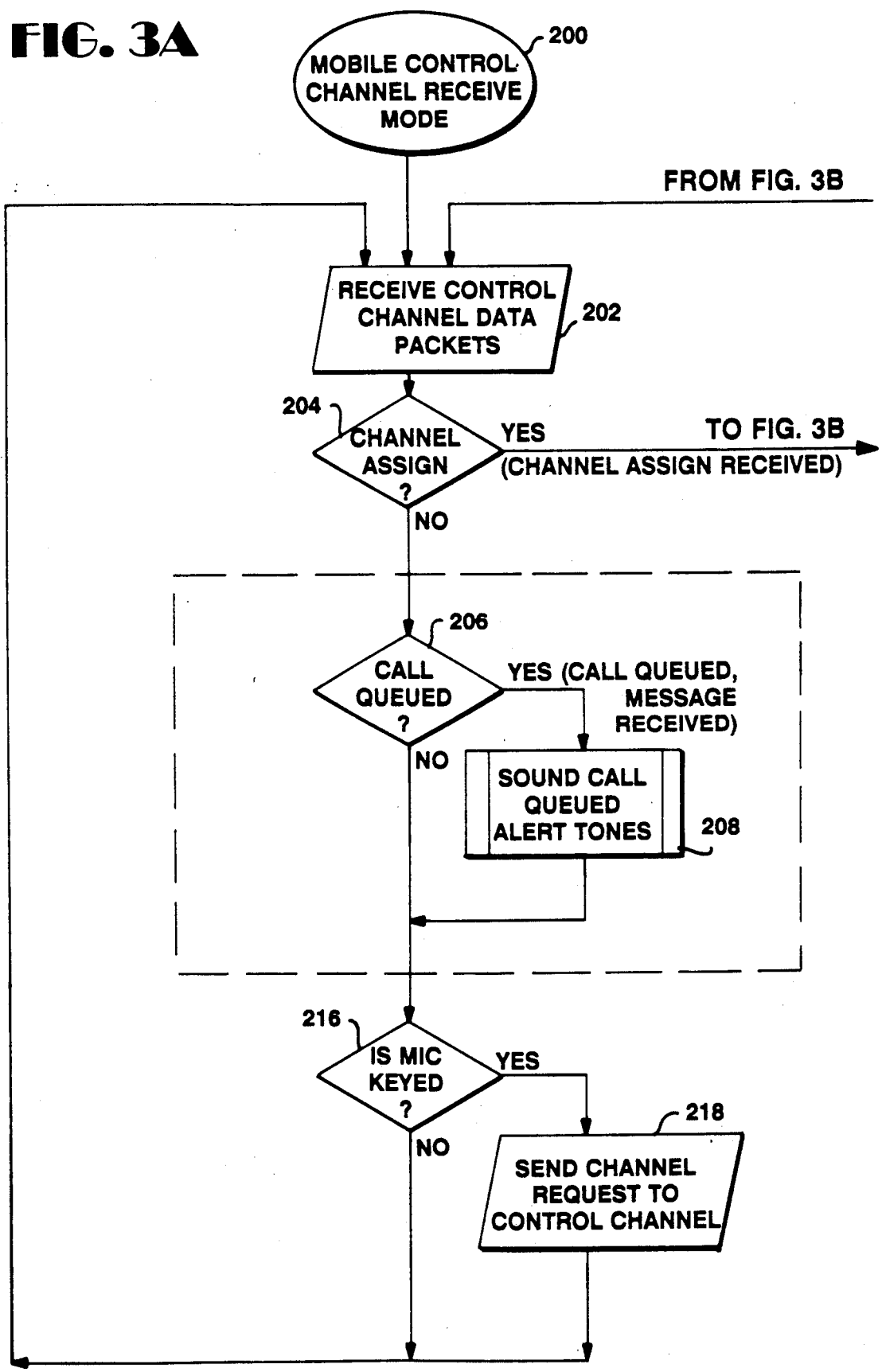

TRUNKED RADIO SYSTEM HAVING FLEET QUEUE ALERT

This is a continuation of application Ser. No. 07/286,691, filed Dec. 20, 1988, now abandoned.

FIELD OF THE INVENTION

This invention relates generally to trunked radio repeater systems. More specifically, the invention relates to trunked radio repeater systems in which a calling unit is provided an indication that all channels are busy and that it has been placed in a queue of callers requesting service.

BACKGROUND AND SUMMARY OF THE INVENTION

In many localities a plurality of radio frequency channels are allocated for use by either mobile or portable radio transceivers. As used herein, examples described identifying mobile radios are equally applicable to portable radios and vice versa. Each of the radio channels used by mobile or portable radio units usually includes at least two separate and distinct frequencies, one for transmitting and one for receiving. Generally, there may be, and usually are, many more mobile radio transceivers than there are available radio channels in a given locality.

Consequently, some arrangement is needed for sharing available spectrum space among users. One such arrangement enables a mobile radio transceiver user to obtain access to a radio channel that is not in use (without disturbing the privacy of channels already in use) and to thereafter establish communication with one or more specifically designated mobile transceivers over that acquired radio frequency. When the user is finished using the channel, the user relinquishes it for use by other mobile transceivers.

One such system for establishing communication between mobile radio transceivers using a repeater system over a radio frequency channel selected from a plurality of such channels is disclosed in commonly assigned U.S. Pat. No 4,360,927 to Bowen et al issued Nov. 23, 1982, which U.S. Patent is expressly incorporated herein by reference. Such a repeater system is utilized to route signals for rebroadcast to receiving mobiles since direct mobile-to-mobile radio communications are limited in range by low antenna heights and relatively low power.

Many diverse groups of mobile users in the same community utilize the same repeater system by transmitting and receiving on the appropriate frequencies. In general, the type of communication on a community repeater is a push-to-talk, release-to-listen message transmission of short duration in between one mobile user and a group of at least one other mobile user.

Trunked radio repeater systems offer better control of communications by being automatically trunked on a plurality of communication channels. Mobile or portable users in such a system must request service from a controller and receive a channel assignment and permission to transmit from the controller before being allowed to transmit on one of the channels. In such a trunked radio system, a calling unit initiates a call by, for example, depressing a push-to-talk control switch. The depression of the push-to-talk control switch in addition to "waking up" the transceiver microprocessor associated with the calling unit additionally serves to inform a system controller associated with the repeater system that a calling unit is requesting service. The system controller searches for an available channel. If a channel is available, both the calling unit and the called units are informed as to the operating or working channel which has been automatically assigned to handle the transmission between units. The channel service request message to the system controller and the message from the system controller to the mobile units relating to the working channel assignment occur over a control channel.

In such trunked radio repeater systems, if the system controller determines that a request for channel assignment is made at a time when all channels are busy, demands for service on the system are placed in a queue (e.g., a memory device associated with the system controller which stores indicia relating to the service request). The calling unit is informed, for example, by a digital message transmitted over the control channel that all channels are currently busy and that it has been placed in the queue of callers requesting service. As operational or working channels become available, these channels are assigned to calling units from the queue of callers requesting service but which were unserved at the time of request due to the system being busy.

In trunked radio systems, mobile units have heretofore been grouped into formalized related fleets. Each of the units in a fleet may, for example, have associated coding schemes such as continuous subaudible signals or digital signals which are transmitted by a mobile in the fleet to activate otherwise muted receivers of other members of its fleet. In this manner, a mobile user no longer has to monitor every message on the channel.

Heretofore, in a trunked radio system where mobile units are grouped into fleets, when all channels are busy, the calling unit is transmitted, for example, a digital message over the control channel to indicate that it has been placed in the queue of callers requesting service. The present invention recognizes that there is a dire need, not only to inform the calling unit that it has been placed in queue, but also to inform all units in the fleet that a call initiating unit has been placed in queue.

As will be appreciated by those familiar with the portable or mobile radio communications art, transmissions often involve messages relating to emergency or other public interest related communications. Additionally, a calling unit associated with a fleet dedicated to a particular business enterprise from time to time transmits a messages of critical importance to the enterprise. For example, a calling unit may need to redirect other members of the fleet to a location in the community where representatives of the enterprise are required to be present.

In accordance with the present invention, not only is the initiating or calling unit provided with an indication that all channels are busy and that it has been placed in queue, but also the called units in the respective called fleet are given an indication that in effect they have been placed in queue. This indication may, for example be an audible indication and/or a visual indication from a display lamp, light emitting diode or liquid crystal display.

In this fashion, each mobile or portable radio in a fleet is provided with advance notice that it is about to receive a call momentarily. In this regard, such a mobile or portable radio is informed that as soon as the system can provide a channel assignment for the calling unit, that a call will be received. Accordingly, a member of the fleet receiving such advance notice, rather than leaving his or her vehicle or turning off his or her radio to, for example, take an extended break, will be informed to standby the radio since a call is imminent.

In this fashion, the present invention enhances the probability that an emergency call, which may have life and death consequences (or an important business call) will be received and responded to rather than go unanswered. This advance notice of an impending communication for a particular group or fleet of a trunked radio system places all units receiving the queue indication in the "be ready to receive a radio call" status.

The fleet queue alert thereby notifies all units in the fleet that one unit in the fleet has requested service on the system, found the system "busy", and has been placed in a queue for assignment of a communications channels as soon as the system load, including previously queued units, permits.

In addition to placing all units of a fleet receiving the queue indication in a "be ready to receive radio call" state, the present invention also contemplates use in conjunction with a telephone interconnection network where a telephone call via an interconnected landline is attempted to be placed with a mobile or portable radio. In this embodiment, a called (individual) mobile or portable radio user is alerted that he or she is about to receive a landline to mobile call.

BRIEF DESCRIPTION OF THE DRAWINGS

Many of the additional advantages and features of the present invention will be more readily apparent and better understood by reference to the following detailed description of the exemplary embodiments considered in conjunction with the accompanying drawings of which:

FIG. 2 is an exemplary schematic block diagram of the site controller shown in FIG. 1;

FIGS. 3A and 3B are a flowchart delineating the sequence of processing operations performed in a mobile radio unit in accordance with the present invention relating to informing all units in the fleet that a call is queued.

DETAILED DESCRIPTION OF THE DRAWINGS

Figure 1:
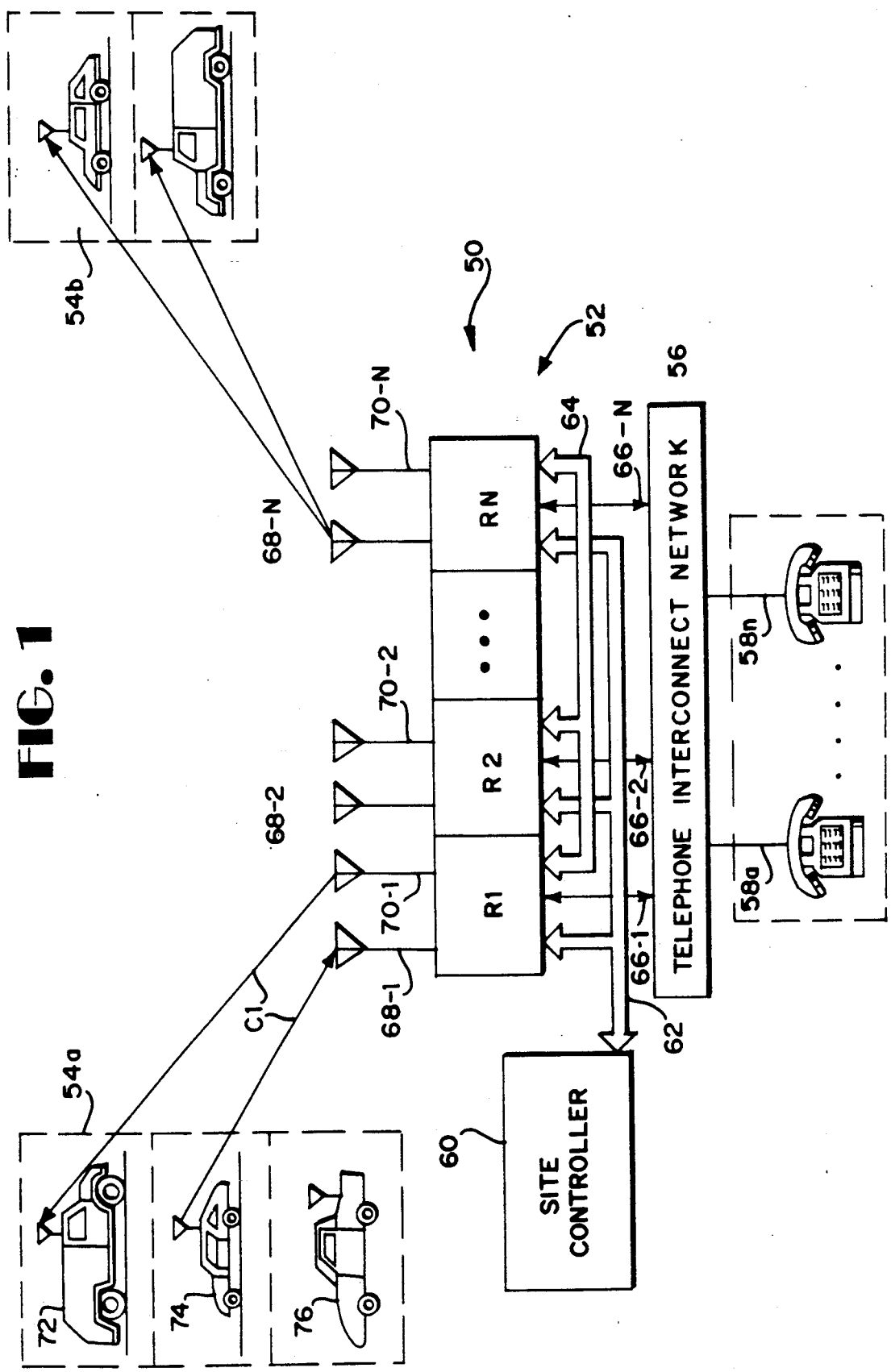
FIG. 1 is a general block diagram of an exemplary trunking radio communications system according to the present invention.

FIG. 1 is a schematic block diagram of an exemplary embodiment of a trunking radio communications system 50 in accordance with the present invention. System 50 includes a repeater base station set 52 and plural fleets or groups 54a-54n of mobile or portable radio transceivers (only two groups 54a and 54b of transceivers are shown but any number of groups of transceivers can be provided). Repeater base station set 52 is connected via a telephone interconnect network 56 to one or more conventional standard telephone lines 58a-58n ("land lines") which are used to establish communications between standard telephones and mobile transceivers.

Repeater base station set 52 includes a plurality of individual repeater transceivers R1-RN, a site controller 60, a data communications bus 62 (connecting the site controller to the repeater transceiver), and in some implementations may also have a further data communications bus 64 (connecting the repeater transceivers to one another). Each repeater transceiver R1-RN is capable of communicating with site controller 60 via data bus 62, and is also capable of communicating directly with any other repeater transceiver via data bus 64.

Repeater transceivers R1-RN are each connected to telephone interconnect network 56 via an analog signal path (66-1 through 66-N, respectively). Each repeater R1-RN is also connected to a transmit antenna (68-1 through 68-N, respectively) and to a receive antenna (70-1 through 70-N, respectively).

Repeaters R1 through RN each permit radio transceivers within a group 54 of transceivers to communicate with one another over a communications channel. Groups 54a-54n of mobile transceivers each include at least one mobile radio transceiver, and may each include two or more transceivers (the transceivers need not be mobile, of course, but might be portable or fixed in position). Repeaters R1-RN operate independently on different communications channels, so that as many groups of mobile radio transceivers can communicate simultaneously (without interference from the communications of other groups and without intrusion by transceivers in other groups) as there are repeater transceivers.

Repeaters R1-RN are full duplex transceivers in the preferred embodiment (meaning that they each can transmit and receive simultaneously). Conventional techniques for sufficiently separating the input and output frequencies of repeater transceivers R1 through RN and the use of filtering and other techniques permit the repeater transceivers to operate simultaneously on different frequencies on a non-interfering basis.

Typically, each fleet or group 54a-54n of mobile radio transceivers has a common basis. For example, mobile radio transceivers installed on all vehicles owned by a given business may be included in the same group. Communications are generally restricted within each group (i.e., any member of a group of radio transceivers may communicate with any other member of the same group, but communications between members of different groups is not possible). A given mobile transceiver may be a member of more than one group if desired. Each group is pre-assigned a predetermined call signalling destination, which can be either an analog (tone) signalling format or a digital format uniquely identifying the group.

As noted above, the mobile or portable radio transceivers which comprise one of the groups or fleets 54a to 54n may each be affiliated with the same business organization or division thereof. By way of example only, the radios 72, 74 and 76 associated with fleet 54a may constitute a security division within the business enterprise. A calling radio unit in fleet 54a may have a fleet selection switch having a switch position which the radio is programmed to respond to by transmitting messages to all the other members of fleet 54a. In this fashion, security messages may be transmitted to all units in such a security fleet. A calling unit may additionally have switch positions which the radio is programmed to respond to by transmitting messages to the units of another fleet 54b (which may be, for example, an emergency medical fleet).

The present invention may be most advantageously utilized where, for example, there is a need for an emergency or other important communication to units in fleet 54a and all channels are busy. Under such circumstances, if a call is initiated, all members of the fleet are informed to standby to receive a call since someone in the fleet is attempting to call.

In an alternate mode of operation, system 50 can be used to establish communications between a land line and at least one of a group of mobile radio transceivers. The calling party who wishes to contact the mobile transceiver(s) simply utilizes the public switched telephone network to call a standard pre-assigned telephone number corresponding to telephone interconnect network 56. Telephone interconnect network 56 automatically "answers" the call by taking the telephone line "off hook" and in the case of a telephone line dedicated to a pre-assigned signalling designation, "rings" the transceiver(s) to establish the communications path. In cases where the incoming telephone line is shared by multiple fleets, (signalling designations), the operation is similar, in sequence, except after the "off hook" step, the telephone interconnect network 56 requests the telephone caller to dial (using, e.g., a touchtone keypad) additional digits specifying a code representing a group of mobile radio transceivers to be contacted. In either of the above cases, the site controller 60 determines whether there is a free repeater and associated communications channel available.

Heretofore, if there are no free channels, the telephone interconnect network doesn't answer the telephone. If a free channel is or becomes available, telephone interconnect network 56 connects the telephone line to the repeater transceiver operating on that free channel and the repeater transceiver permits communications to take place between the landline caller and the radio transceiver operators. As will be explained further below, in accordance with an additional embodiment relating to the telephone interconnect network, this invention contemplates that when there are no free channels, the called party or parties as well as the calling party receives an indication that the landline call connection is imminent.

For further details relating to the hardware, software and modes of operation of the mobile radio transceivers, exemplary signalling protocols, and other operational details relating to the system of FIG. 1, reference is hereby made to commonly assigned U.S. Pat. No. 4,682,367, which issued July 21, 1987. This patent is hereby expressly incorporated by reference herein.

FIG. 2 is a schematic block diagram of an exemplary site controller 60 shown in FIG. 1. Site controller 60 includes a microprocessor 150, a read only memory (ROM) 152, an input/output (I/O) port 154, a data bus 156, and a random access memory (RAM) 158. I/O port 154 is connected to data bus 62, and thus provides a means by which information can be communicated between selected repeater transceivers R1-RN and site controller 60. ROM 152 contains stored program control information and other data necessary to control microprocessor 150 to perform a sequence of predetermined steps. RAM 158 contains information used by site controller 60 and by repeater transceivers R1 through RN to control the operation of system 50. Microprocessor 150, ROM 152, I/O port 154, and RAM 158 communicate with one another via data bus 156. The internal structures and operating features of each of these components is conventional and well known to those skilled in the art, and further details need not be provided herein.

RAM 158 stores a table 160 containing a plurality of blocks 162 of data relating to the status of repeaters R1 through RN. Thus, block 162(1) stores information relating to the status of repeater R1, block 162(2) stores information relating to the status of repeater R2, and block 162(N) stores information relating to the status of repeater RN. The contents of blocks 162 are updated periodically as the status of the repeaters to which they relate changes.

Blocks 162 each include storage locations containing the following information a busy flag; a group field; and an interconnect flag. An index field specifying the repeater and/or communications channel to which the block relates may also be provided and/or other conventional techniques for indexing these blocks may be used. The busy flag of a block 162 is set whenever the repeater it relates to has dedicated the communications channel it operates upon to a group of mobile radio transceivers, and is otherwise unset. When a repeater dedicates a communications channel to a particular group of mobile radio transceivers, a code designating that group (the same code preferably also specifying the call signalling sequence associated with the group) is written into the group field of the block 162 associated with that repeater. The interconnect flag of a block 162 is set whenever the repeater associated therewith is interconnected with a landline via telephone interconnect network 56, and is otherwise unset.

RAM 158 also stores a "validity" table 164 which includes a listing of all of the groups of mobile radio transceivers supported by system 50, and a valid flag associated with the listing of each group. Validity table 164 permits site controller 60 to restrict the use of system 50 to groups of mobile radio transceivers which have been declared to be "valid" on the system. Typically, only a limited number of all possible call signalling sequences are assigned to groups of mobile radio transceivers supported by system 50, and only the assigned groups are listed in validity table 164. Moreover, it is sometimes desirable to deny a group of mobile radio transceivers listed in validity table 164 the use of system 50. For example, a group of users which have contracted to pay for the use of system 50 but which has been delinquent in paying for radio services may be prevented from accessing the system by simply changing the value of the valid flag associated with the listing for this group from "valid" to "invalid".

A queue 165 which may, for example, be located in RAM 158 or in the microprocessor 150 general registers is utilized to store requests for service from calling units when all channels are busy. As working channels become available, they are served from the queue 165 of callers requesting service. Such service requests may be handled on either a first-in, first-out or priority basis. Typically, the queue 165 stores at least a fleet identifier and indicia identifying the calling unit.

The manner in which the information stored in tables 160 and 164 is manipulated and changed is described in connection with FIGS. 7 through 13 of U.S. Pat. No. 4,682,367. FIG. 6 of U.S. Pat. No. 4,682,367 shows an exemplary mobile radio transceiver which may be used herein which includes a transceiver processors 206 and 208 and all the structure required for transmitting and receiving on any of the systems communication channels.

Figure 3B:
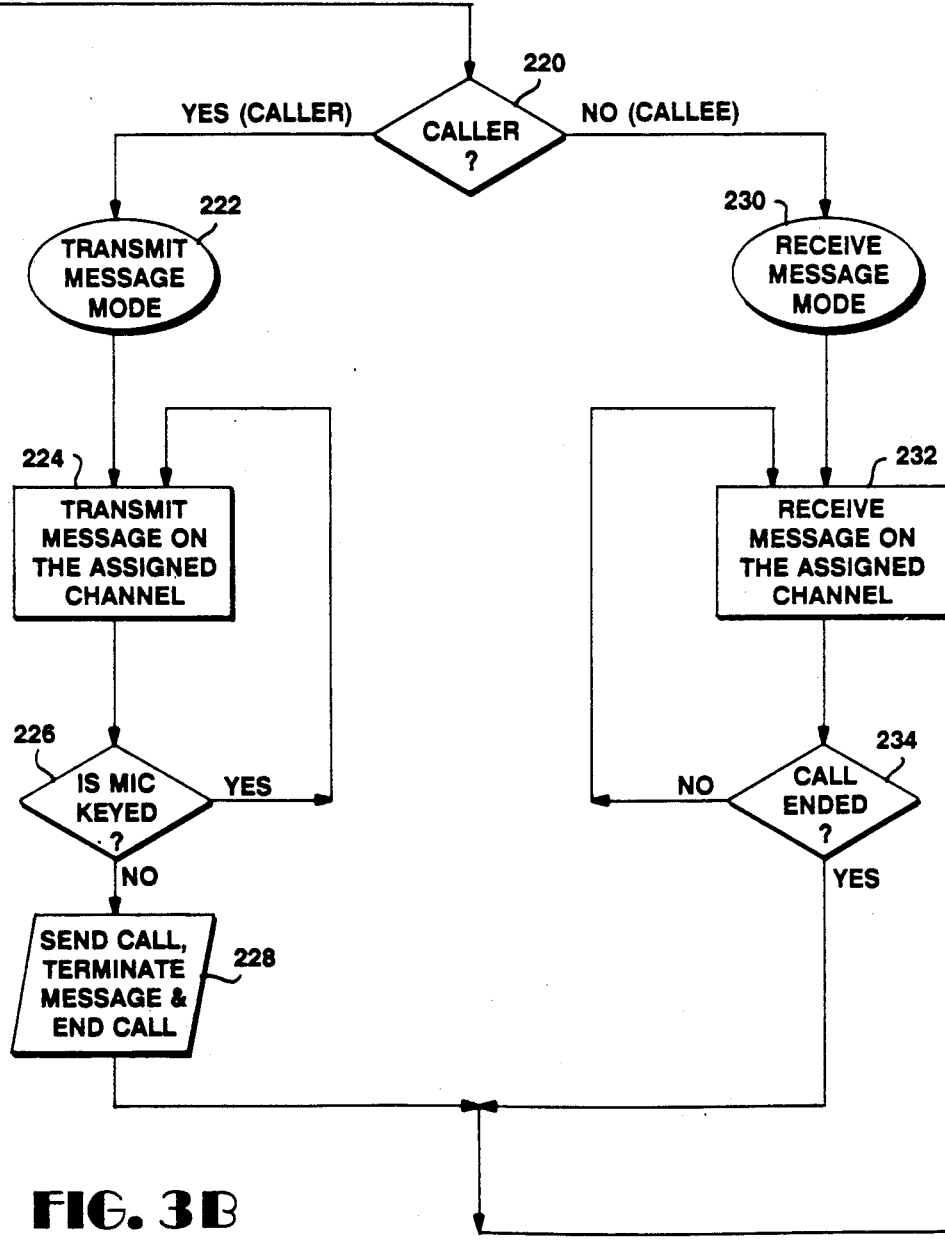

FIGS. 3A and 3B disclose the sequence of operations performed by the radio units processing hardware in implementing the call queuing feature of the present invention. Additionally, the flowchart indicates the general flow of control in the mobile radio when a channel assignment is made.

Before FIGS. 3A and 3B are described in detail, it is noted that in accordance with the present invention, an initiating mobile sends a channel request data packet to the site controller on the control channel when a user keys the microphone. The site controller responds to the channel request data packet via the control channel by either sending back a channel assignment to the calling mobile or sending a call queue message in a control channel data packet. If a valid channel assignment is detected by either the initiating or receiving mobile, then the units switch to the assigned channel and the call is connected. If a call queued message is detected then both the initiating and receiving mobiles will sound call queued alert tones or will otherwise be provided with an indication that a call is imminent. This allows all units in a particular fleet to know that a call will be received as soon as a channel is available.

As suggested in FIG. 3A at block 200, the mobile control channel must initially be "quiet", i.e. in the receive mode, in order for the processing set forth in FIGS. 3A and 3B to take place. The mobile radio awaits the receipt of a data packet from the site controller over the control channel.

As indicated at block 202, the mobile radio periodically receives a control channel data packet from the site controller. The data packets received over the control channel include a site identifier and a control channel identifier. The data packet may additionally include a working channel assignment. If the data packet includes a channel assignment, the channel assignment identifies the assigned working channel, the calling unit and the fleet number associated with the calling unit to identify the fleet for which service has been requested.

Upon receipt of a control channel data packet, a decision is made at the mobile radio as to whether a channel assignment has been received as determined by decoding the data in the data packet (204). If no channel assignment has been received, the routine sequences to block 206. If a channel has been assigned, the operations generally depicted in FIG. 3B are performed as will be described further below.

If the check at block 204 reveals that a channel assignment has not been received, a decision is made as to whether a call has been queued (206). If a call intended for the mobile unit has been queued, the data packet will contain a call queued message which identifies that a call has been queued. The call queued message also identifies the group or fleet and identifies the calling unit. It is noted that, even if all channels are busy, a call may not be queued if the queue is full. If the queue is full, a received call request is not queued but rather a system busy signal is generated and transmitted to the calling unit.

If the call is queued, as determined at block 206, then the mobile unit decodes the call queued message and, for example, responds by generating call queued alert tones (block 208). In this fashion, as a result of, for example, the generation and transmission by the site controller of a call queued digital message, call alert tones may be sounded in each of the units in the fleet to alert all such units of the call queuing. Units in the fleet may alternatively be alerted of a call being queued by the detection and reception of call queue alert tones rather than by reception of a digital message. The present invention additionally contemplates illuminating a "BE READY TO RECEIVE CALL" lamp associated with the mobile units or an equivalent LCD or LED display to visually display a call queued message.

As indicated above, the identifying units in the fleet are identified by a fleet number contained in the data packet received at block 202. Thus, all units on the control channel with the fleet number identified in the data packet, upon decoding the appropriate fleet number, receive the call queuing indicative digital signals. The units respond to the signals indicative of call queuing by alerting the operators in the fleet of call queuing visually and/or audibly.

If the check at block 206 reveals that no call queued message has been received, or after the queue alert tones have been sounded at 208, the routine checks to determine whether the radio microphone is keyed, as indicated by the depression of the push-to-talk control switch (216). If the push-to-talk switch has been depressed, then a channel request is sent to the repeater base station 52 via the control channel (218).

If the microphone is not keyed as determined at block 216, or after a channel request is sent to the control channel (218), the routine branches to block 202 where the routine awaits receipt of a control channel data packet. As indicated above, upon receipt of the control channel data packet, a check is made at block 204 to determine whether a channel assignment has been received.

If a channel has been assigned, then the trunked radio system operation proceeds as, for example, disclosed in the above-mentioned, commonly assigned U.S. Pat. No. 4,682,367. If a channel has been assigned, the general operation of the system is as follows. A check is made as indicated at block 220 to determine whether the mobile unit is the callee or the caller as indicated by the received data packet which identifies the initiating unit. If the mobile radio is the caller, then the unit is placed in the transmit mode (222). Once a channel has been assigned to a caller in the transmit mode, the caller is permitted to transmit a message on the assigned channel (224).

As indicated at block 226, the unit continues to check whether the microphone is being keyed. As long as the microphone is keyed, the routine branches back to block 224 and continues to transmit the message on the assigned channel. Once the check at block 226 indicates that the microphone is no longer being keyed, then a call terminate message is sent which ends the call (228).

If the check at block 220 identifies that mobile unit is the callee, then the mobile unit is placed in the receive message mode (230). Being in the receive message mode, the mobile unit continues to receive the message on the assigned channel (232) until a check at 234 indicates that the call has ended. The end of the call is detected by detecting a call terminate message such as the message generated at block 228. After the call terminate message is sent at block 228, or after the call has ended as determined at block 234, the routine branches back to block 202 in FIG. 3A to await the next control channel data packet.

Figure 4:
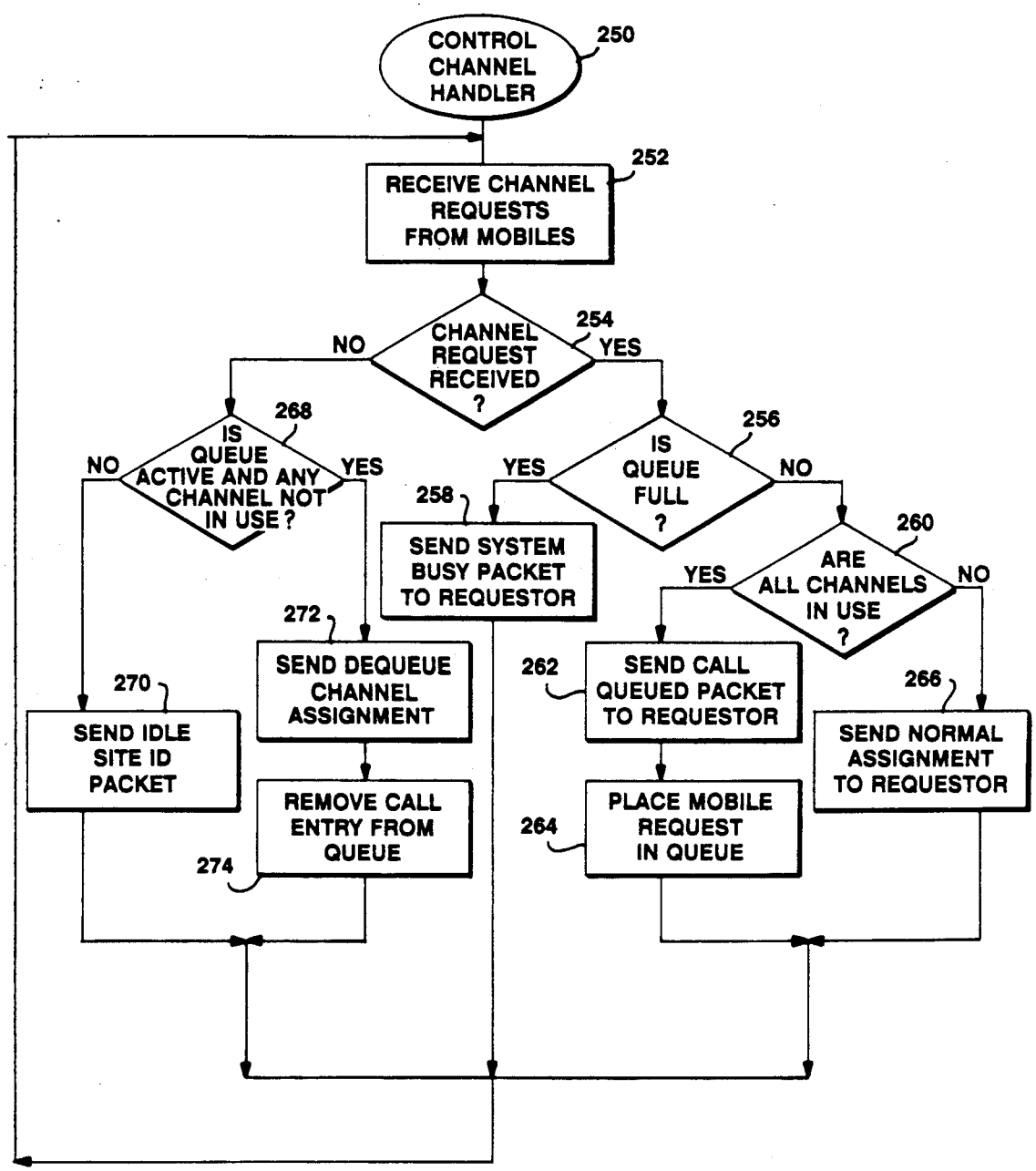
FIG. 4 is a flowchart delineating the sequence of processing operations performed at the site controller in implementing the call queue alert feature of the present invention.

FIG. 4 discloses the sequence of operations performed under the control of site controller microprocessor 150 (shown in FIG. 2) in alerting all units in the fleet of a call request being queued. The control channel handler routine (250) is executed by microprocessor 150 to process received channel requests from mobile units over the control channel (252). Thus, the site controller awaits communication from a mobile (or portable) radio over the control channel.

Upon receiving a data packet from a mobile unit, the routine checks to determine whether a channel assignment request has been received (254). As indicated above, RAM 158 shown in FIG. 2 stores a validity table 164 which includes a listing of all the groups of mobile radio transceivers supported by the system 50 and a valid flag associated with each listing of each group. In this fashion, the site controller may restrict use of the system to groups of mobile transceivers which have been declared valid by the system.

If the check at block 254 indicates that a valid channel request has been received, then a check is made at block 256 to determine whether the queue is full. Typically, when all the channels are busy a call will be queued unless the limit of calls which may be queued has been exceeded. In this regard, only a finite number of calls may be queued, e.g., 16 calls. If the queue is full, then the requester is sent a system busy packet: (258) and the routine branches back to block 252.

If the queue is not full, a check is made to determine whether all channels are currently in use (260). If all channels are in use, then the requester is sent a control channel data packet which includes a call queued message as describe above in conjunction with block 206 (262). Thereafter, the mobile request is placed in the queue 165 shown in FIG. 2 (264) and the routine branches back to block 252. If all channels are not in use as determined by the check at block 260, then the requester is sent a control channel data packet that includes a normal channel assignment (266) and the routine branches back to block 252.

If the check at block 254 indicates that no channel request has been received, then the routine checks to determine whether the queue is active, i.e., contains channel request entries, and any channel is not in use. If the queue is active and a channel is not in use (268) then as indicated at block 272, a channel assignment is made from a request in the queue. Thereafter, the associated channel request entry is removed from the queue (274) and the routine branches back to block 252. If the check at block 268 yields a negative response, then an idle site and control channel identifier packet is transmitted on the control channel to all units in the system (270) and the routine branches back to block 252 awaiting receipt of a channel assignment request from a mobile unit.

Turning now to the alternative telephone interconnect embodiment of the present invention, as noted above, a caller may make a call via telephone line 58a through 58n shown in FIG. 1 to one or more mobile units. If after dialing, for example, a particular mobile station identification number, the system may be busy and the call may not be able to be completed at that time. In accordance with the present invention, microprocessor 150, in addition to informing the telephone caller that the system is busy and that a channel cannot be immediately assigned, also informs the called unit that the landline call has been queued and that the call will be made momentarily as soon as a channel is assigned. Thus, essentially, the same logic flow indicated at blocks 260, 262 and 264 of FIG. 4 is accomplished in a telephone interconnect context.

If the party making the call, rather than keying in an individual mobile identification number, keys in the fleet number, the system will generate signals indicative of call queuing to all units having fleet number identified by the telephone caller. In the landline embodiment, the telephone caller is additionally informed that although all lines are temporarily busy, the call will go through as soon as a channel becomes open. The notification to the called party or parties enhances the probability that a call will in fact go through.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A radio communications system having a plurality of channels over which a calling unit may communicate with at least one called unit comprising:
   means for receiving a request for channel assignment from said calling unit;
   means for determining whether a channel is available to be assigned;
   means, responsive to said means for determining, for placing a request for channel assignment in a queue if no channel is available; and
   means for informing said calling unit and said at least one called unit when said request for channel assignment has been placed in said queue, whereby said at least one called unit is given advance notice of an imminent call before a channel is available.

2. A radio communications system according to claim 1, wherein said calling unit and said at least one called unit are part of a common fleet.

3. A radio communications system according to claim 1, wherein said calling unit is a telephone unit.

4. A radio communications system according to claim 1, wherein said calling unit and said at least one called units are mobile radios.

5. A radio communications system according to claim 1, wherein at least one of said units is a portable radio.

6. A radio communications system according to claim 1, wherein said means for informing includes means for generating signals indicative of a calling unit request for channel assignment being placed in said queue.

7. A radio communications system according to claim 6 further including a control channel and wherein said signals comprise a predetermined code which are transmitted over said control channel.

8. A radio communications system according to claims 6, wherein each of said units includes means responsive to said signals for indicating that a call has been queued.

9. A radio communications system according to claim 8, wherein said means for indicating includes means responsive to said signals for generating a predetermined tone pattern.

10. A radio communications system according to claim 8, wherein said means for indicating includes means responsive to said signals for providing a visual indication that a call has been queued.

11. A radio communications system according to claim 1, further including a fleet of radio units wherein said means for informing includes means for alerting all units in the fleet that a calling unit's request for channel assignment has been placed in queue.

12. A radio communications system according to claim 1, wherein each of said units includes means responsive to a message received from said means for informing for decoding said message and for sounding call queue indicative alert tones in response to decoding a call queued message.

13. In a radio communications system having a plurality of channels over which a calling unit may communicate with at least one called unit, a method for informing called units in the system that a call si imminent comprising the steps of:
   receiving a request for channel assignment from a calling unit;
   determining whether a channel is available to be assigned;
   placing a request for channel assignment in a queue if no channel is available; and
   informing said calling unit and said at least one called unit when said request for channel assignment has been placed in said queue, whereby said at least one called unit is given advance notice of an imminent call before a channel is available.

14. A method according to claim 13, wherein said calling unit and said at least one called unit are part of a common fleet.

15. A method according to claim 13, wherein said calling unit is a telephone unit.

16. A method according to claim 13, wherein said calling unit and said at least one called unit are mobile radios.

17. A method according to claim 13, wherein at least one of said units is a portable radio.

18. A method according to claim 13, wherein said step of informing includes the step of generating signals indicative of a calling unit request for channel assignment being placed in said queue.

19. A method according to claim 18, wherein said system includes a control channel and wherein said signals comprise a predetermined code further including the step of transmitting said signals over said control channel.

20. A method according to claims 18, further including the step of indicating that a call has been queued in each of said units in response to said signals.

21. A method according to claim 20, wherein said step of indicating includes the step of generating a predetermined tone pattern in response to said signals.

22. A method according to claim 20, wherein said step of indicating includes the step of providing a visual indication that a call has been queued in response to said signals.

23. A method according to claim 13, wherein said system includes a fleet of radio units and wherein said step of informing includes alerting all members in the fleet that a calling unit's request for channel assignment has been placed in said queue.

24. For use in a radio communications system having a plurality of channels over which a calling radio unit may communicate with at least one called radio unit via a central controller, a radio unit comprising:
   means for receiving a message from said central controller;
   means responsive to said message for determining whether a channel has been assigned to said radio unit; and
   means responsive to said message for determining when a call for said radio unit from a calling unit has been placed in a channel assignment request queue, whereby said radio unit is given advance notice of an imminent call before a channel has been assigned to said call.

25. A radio unit according to claim 24, wherein said radio unit is part of a common fleet of radio units.

26. A radio unit according to claim 24, wherein said radio unit is a mobile radio.

27. A radio unit according to claim 24, wherein said radio unit is a portable radio.

28. A radio unit according to claim 24, further including means responsive to said message for indicating that a call has been queued.

29. A radio unit according to claim 28, wherein said means for indicating includes means responsive to said message for generating a predetermined tone pattern.

30. A radio unit according to claim 28, wherein said means for indicating includes means responsive to said message for providing a visual indication that a call has been queued.

* * * * *